United States Patent
Moore et al.

(10) Patent No.: US 9,915,328 B2
(45) Date of Patent: Mar. 13, 2018

(54) CENTERING POSTS FOR POSITIONING A HUB

(71) Applicant: Schaeffler Technologies AG & Co. KG, Herzogenaurach (DE)

(72) Inventors: Kelli Moore, Eureka, MO (US); Matthew Smith, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 345 days.

(21) Appl. No.: 14/696,997

(22) Filed: Apr. 27, 2015

(65) Prior Publication Data
US 2015/0323052 A1    Nov. 12, 2015

Related U.S. Application Data

(60) Provisional application No. 61/989,682, filed on May 7, 2014.

(51) Int. Cl.
*F16H 41/24* (2006.01)
*F16H 45/02* (2006.01)

(52) U.S. Cl.
CPC ....... *F16H 41/24* (2013.01); *F16H 2045/021* (2013.01); *F16H 2045/0226* (2013.01); *F16H 2045/0294* (2013.01)

(58) Field of Classification Search
CPC .... F16H 41/24; F16H 41/30; F16H 2045/021; F16H 2045/0226; F16H 2045/0294
USPC .......................................................... 60/364
See application file for complete search history.

(56) References Cited

U.S. PATENT DOCUMENTS

| | | | | |
|---|---|---|---|---|
| 5,168,702 A | * | 12/1992 | Sakakibara | F16H 41/28 60/345 |
| 5,388,678 A | * | 2/1995 | Murata | F16H 45/02 192/3.29 |
| 5,699,887 A | | 12/1997 | Kundermann | |
| 6,016,894 A | | 1/2000 | Kundermann | |
| 6,155,392 A | * | 12/2000 | Kundermann | F16H 45/02 192/3.3 |
| 6,216,836 B1 | * | 4/2001 | Illig | F16H 41/24 192/107 R |

(Continued)

FOREIGN PATENT DOCUMENTS

| | | |
|---|---|---|
| JP | 2013217452 | 10/2013 |
| WO | 2008046380 A1 | 4/2008 |

OTHER PUBLICATIONS

International Search Report and Opinion for PCT/US2015/027762; 12 pgs; dated Jul. 31, 2015 by the Korean Intellectual Property Office.

*Primary Examiner* — Thomas E Lazo
(74) *Attorney, Agent, or Firm* — LeKeisha M. Suggs

(57) ABSTRACT

A cover hub assembly for a torque converter comprising: an axis of rotation; a cover including: an outer surface; an inner surface; and, at least two extruded pins protruding from inner surface and symmetrical about the axis of rotation; and, a cover hub including: a cylindrical wall having: a thickness; an inner cylindrical surface, symmetrical about the axis of rotation, forming an opening; and, an outer cylindrical surface symmetrical about the axis of rotation; a cover mounting portion including at least two mating holes for receiving said extruded pins; and, at least one flow groove extending from the outer cylindrical surface to the inner cylindrical surface.

20 Claims, 8 Drawing Sheets

(56) References Cited

U.S. PATENT DOCUMENTS

| | | | | |
|---|---|---|---|---|
| 6,260,354 B1* | 7/2001 | Schoder | .................. | F16H 45/02 |
| | | | | 60/330 |
| 6,431,335 B1* | 8/2002 | Kundermann | .......... | F16H 45/02 |
| | | | | 192/3.3 |
| 6,471,021 B1 | 10/2002 | Sasse et al. | | |
| 7,770,703 B2* | 8/2010 | Mauti | .................... | F16H 45/02 |
| | | | | 192/3.29 |
| 7,841,174 B2 | 11/2010 | Van Sickle | | |
| 8,973,357 B2* | 3/2015 | Lindemann | .......... | F16J 15/3216 |
| | | | | 277/500 |
| 9,303,747 B2* | 4/2016 | Mototsune | ............. | F16H 45/02 |
| 2009/0266665 A1 | 10/2009 | Huegel et al. | | |
| 2010/0044176 A1* | 2/2010 | Daniel | ................... | F16H 45/02 |
| | | | | 192/3.29 |
| 2011/0120829 A1 | 5/2011 | Vanni et al. | | |
| 2013/0056319 A1* | 3/2013 | Lindemann | ............. | F16H 45/02 |
| | | | | 192/3.29 |
| 2013/0224002 A1* | 8/2013 | Ito | .......................... | F16H 41/30 |
| | | | | 415/182.1 |

\* cited by examiner

CENTERING POSTS FOR POSITIONING A HUB

FIELD

The invention relates generally to a cover hub assembly for a torque converter.

BACKGROUND

U.S. Patent Publication No. 2009/0266665, hereby incorporated by reference herein, describes a hub staked to a cover. Centering or positioning posts are not disclosed.

U.S. Pat. No. 7,841,174, hereby incorporated by reference herein, describes an attachment between a cover and a pilot boss.

BRIEF SUMMARY

Example aspects broadly comprise a cover hub assembly for a torque converter comprising: an axis of rotation; a cover including: an outer surface; an inner surface; and, at least two extruded pins protruding from inner surface and symmetrical about the axis of rotation; and, a cover hub including: a cylindrical wall having: a thickness; an inner cylindrical surface, symmetrical about the axis of rotation, forming an opening; and, an outer cylindrical surface symmetrical about the axis of rotation; a cover mounting portion including at least two mating holes for receiving said extruded pins; and, at least one flow groove extending from the outer cylindrical surface to the inner cylindrical surface.

In an example aspect, the at least one extruded pin of the cover hub assembly includes a head having a first diameter and sidewalls having a first depth. In an example aspect, the mating hole includes a bottom portion having a second diameter and side portions having a second depth. In an example aspect, the first diameter is at most equal to the second diameter and the first depth is at most equal to the second depth. In an example aspect, the flow grooves are circumferentially offset from the mating holes. In an example aspect, the hub is matingly engaged with the extruded pin by a compressive force. In an example aspect, the cover hub assembly further comprises at least one weld portion connecting the cover and the hub. In an example aspect, the at least one weld portion is circumferentially aligned with respect to the mating holes and circumferentially offset with respect to the flow grooves. In an example aspect, the cover hub assembly further includes at least one recess portion extending from outer surface axially toward inner surface and symmetrical about the axis of rotation. In an example aspect, the extruded pin is generally cylindrical or frustum shaped.

Other example aspects broadly comprise a cover hub assembly for a torque converter comprising: an axis of rotation; a cover including: an outer surface; and, an inner surface provided with one or more centering protrusions, each protrusion having a first depth; a cover hub including: a cylindrical wall having a thickness and including an outer cylindrical surface and an inner cylindrical surface; and, a cover mounting portion provided with one or more centering recesses for receiving said centering protrusion, each recess having a second depth, where the second depth is greater than the first depth to provide a gap in an axial direction arranged to form one or more recess channels for radial fluid flow. In an example aspect, the one or more recess channels extend from the outer cylindrical surface to the inner cylindrical surface. In an example aspect, the recess channels are aligned with the centering protrusions. In an example aspect, the cover hub assembly further comprises at least one weld connecting the cover to the cover hub, where the recess channels and centering protrusions are offset with respect to the weld. In an example aspect, the centering protrusion of the cover is generally a cross shaped protrusion symmetrical about the axis of rotation. In an example aspect, the cover hub includes four centering recesses symmetrical about the axis of rotation and arranged for aligned engagement with the cross shaped protrusion.

Other example aspects broadly comprise a torque converter comprising: the cover hub assembly as described previously, namely comprising: an axis of rotation; a cover including: an outer surface; an inner surface; and, at least two extruded pins protruding from inner surface and symmetrical about the axis of rotation; and, a cover hub including: a cylindrical wall having: a thickness; an inner cylindrical surface, symmetrical about the axis of rotation, forming an opening; and, an outer cylindrical surface symmetrical about the axis of rotation; a cover mounting portion including at least two mating holes for receiving said extruded pins; and, at least one flow groove extending from the outer cylindrical surface to the inner cylindrical surface; further comprising a seal; a piston including a recess for the seal and arranged for sealing engagement with the cover hub assembly; and, at least one weld, located offset from the at least one flow groove, connecting the hub to the cover.

Other example aspects broadly comprise a torque converter comprising: the cover hub as described previously, namely comprising: an axis of rotation; a cover including: an outer surface; and, an inner surface provided with one or more centering protrusions, each protrusion having a first depth; a cover hub including: a cylindrical wall having a thickness and including an outer cylindrical surface and an inner cylindrical surface; and, a cover mounting portion provided with one or more centering recesses for receiving said centering protrusion, each recess having a second depth, where the second depth is greater than the first depth to provide a gap in an axial direction arranged to form one or more recess channels for radial fluid flow; further comprising a seal; a piston including a recess for the seal and arranged for sealing engagement with the cover hub assembly; and at least one weld, located offset from the one or more recess channels, connecting the hub to the cover.

Other example aspects broadly comprise a torque converter comprising: an axis of rotation; a cover including: an outer surface; and, an inner surface provided with one or more centering protrusions, each protrusion having a first depth; a cover hub including: a cylindrical wall having a thickness and including an outer cylindrical surface and an inner cylindrical surface; and, a cover mounting portion provided with one or more centering recesses for receiving said centering protrusions, each recess having a second depth, where the second depth is greater than the first depth; a first seal; a piston including a recess for the seal and arranged for sealing engagement with the outer circumferential surface of the cover hub; a second seal; a turbine hub arranged for sealing engagement with the inner circumferential surface of the cover hub; and, at least one weld, located offset from the one or more centering recesses, connecting the hub to the cover. In an example aspect, the torque converter further comprises a recess channel for radial fluid flow, wherein the recess channel is formed axially by a gap between the protrusion and the centering recess.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Centering posts, formed integrally in a cover for a torque converter by known methods, in an example aspect, are referred to interchangeably herein as extruded simply posts, pins, or protrusions. A cover hub is referred to as simply a hub, interchangeably herein. In an example aspect, a cover hub assembly, including a cover and a cover hub, is disclosed where the hub is pre-machined to include a sealing surface for a piston and a sealing surface for a turbine hub. In an example aspect, the cover hub includes an inner cylindrical surface machined to receive a bearing and/or a bushing. In an example aspect, the cover includes centering posts or extruded pins for positioning with the hub, which includes corresponding mating holes. Mating holes in the hub provide radial centering and circumferential positions to ensure stitch welded fixing components do not overlap with flow grooves. In an example aspect and as determined by the positioning the hub, stitch welding is controlled so that flow grooves, located offset from the mating holes, are not contaminated with weld material.

Figure 1:
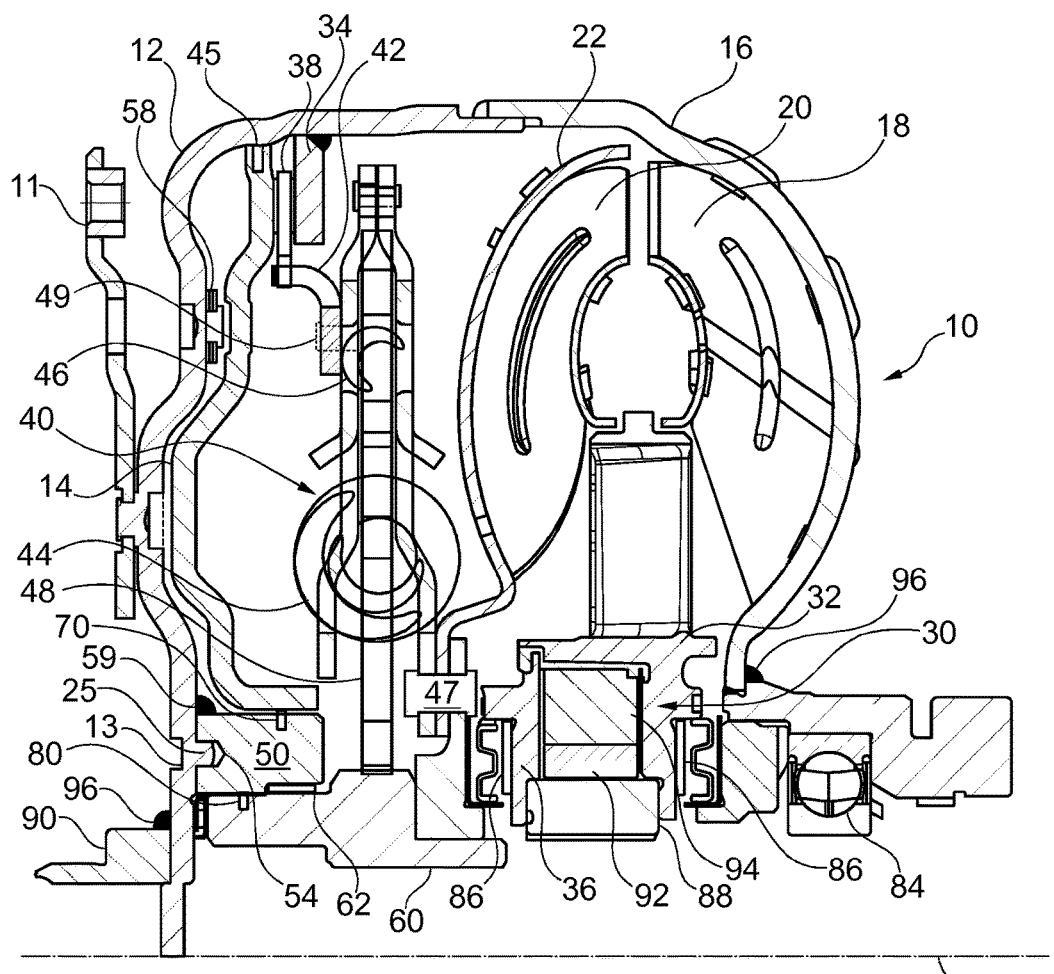
FIG. 1 illustrates a cross sectional side view of a torque converter including a cover hub assembly according to an example aspect.

The following description is made with reference to FIGS. 1-5. FIG. 1 illustrates a cross sectional side view of a torque converter rotatable about axis A and including a cover hub assembly according to an example aspect. Torque converter 10 includes front cover 12 for connecting to a crankshaft of an internal combustion engine via stud/lug 11 and rear cover 16, also referred to as impeller shell interchangeably herein, for an impeller 18. Impellers are also referred to in the art interchangeably as 'pump'. Torque converter 10 also includes turbine 20, turbine shell 22, stator 32 between turbine 20 and impeller 18, and one-way clutch 30 supporting stator 32. Side plate 36 holds one-way clutch 30 in place within stator 32.

Torque converter 10 includes piston 14, leaf springs 58, seal 45, clutch plate 38, clutch backing plate 34, and drive plate 42. Leaf springs 58 connect front cover 12 and piston 14. Torque converter 10 further includes damper assembly 40 including springs 44, radially outward springs 46, flange 48, and rivets 47, 49. Damper assembly 40 is connected to and drivable by turbine 20, and is positioned between turbine 20 and front cover 12. Cover 12 includes recess portion 13 and extruded portion or extruded pin 25. Extruded pin 25 may also be interchangeably referred to as post, protrusion, or pin. Extruded pin 25 is arranged for mating engagement with mating hole 54.

Torque converter 10 includes cover hub 50, turbine hub 60, and seals 70, 80. Cover hub 50 is positioned or centered by aligning and inserting extruded pins 25 into mating holes 54 of cover hub 50. Cover hub or interchangeably 'hub' 50 is sealingly engaged with piston 14 by seal 70. Hub 50 is sealingly engaged with turbine hub 60 by seal 80. Seal 80, which is a dynamic seal, is a teflon seal in an example aspect. Seals 45 and 70 are o-rings in a non-limiting example aspect. Hub 50 is fixed to cover 12 by weld 59; wherein the weld pattern is arranged about axis A so that weld locations are misaligned with flow grooves of cover hub 50, which will be described in detail as relates to FIG. 5. Torque converter 10 further includes bushing 62, bearings 84, 86, inner race 88, roller 92 for one-way clutch 30, outer race 94, welds 96, and cover pilot 90.

Figure 2:
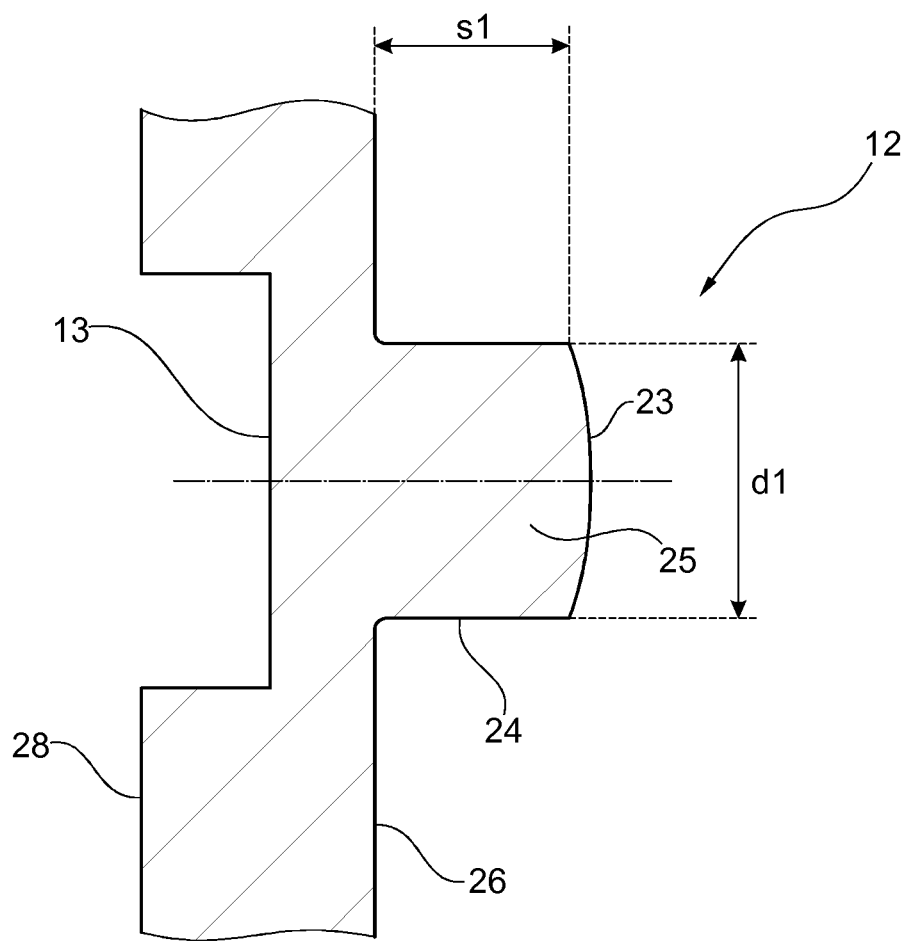
FIG. 2 illustrates a partial side view of a cover including an extruded pin according to an example aspect.

FIG. 2 illustrates a partial side view of a cover including an extruded pin according to an example aspect. Cover 12 includes inner surface 26 and outer surface 28. Cover 12 includes extruded pin or extruded portion 25 protruding out from inner surface 26 and corresponding recess portion 13 at outer surface. Extruded pin 25, having diameter d1, includes head 23 and cylindrical sidewall 24, having length s1. The shape of head 23 is not critical, and may be flat, rounded, pointed, or other such shape as will be accommodated by mating hole to be described below.

Figure 3:
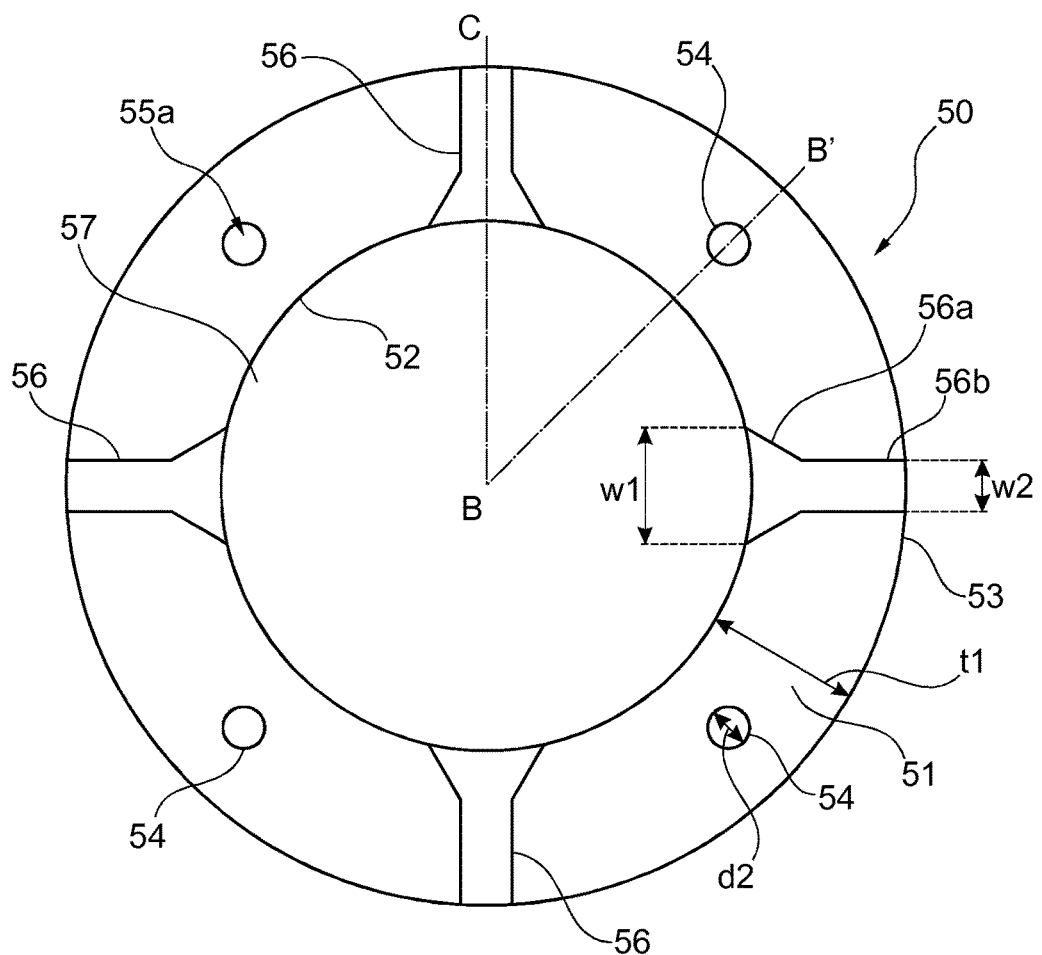
FIG. 3 illustrates a front view of a hub including mating holes and flow grooves according to an example aspect.

FIG. 3 illustrates a front view of a hub including flow grooves according to an example aspect. Cover hub 50 includes cover hub cylindrical wall 51 having thickness t1, inner cylindrical surface 52, outer cylindrical surface 53, mating holes 54, mating hole bottom portion 55a, flow grooves 56, and opening 57. Flow grooves are also referred to as centering recesses, interchangeably herein. Mating holes 54 have diameter d2. Flow grooves 56 are channels including inner portion 56a having width w1 at inner cylindrical surface 52 and outer portion 56b having width w2 at outer cylindrical surface 53. In an example aspect, width w1 of flow groove inner portion 56a is at least equal to width w2 of outer portion 56b. In another example aspect, width w1 of inner portion 56a is greater than width w2 of outer potion 56b.

Mating holes 54, having diameter d2 and bottom portion 55, are arranged to mate with extruded pins 25 of cover 12. In an example embodiment, mating holes 54 are circumferentially offset from flow grooves 56. In other words, as shown in FIG. 3, mating hole 54 is aligned with line B-B', while flow groove 56 is aligned with line B-C. While FIG. 3 illustrates four mating holes and four flow grooves, one skilled in the art would recognize that the number of mating holes and/or flow grooves is not limited and may be any number one or greater. Flow grooves 56, having a depth, allow for fluid flow between hub 50 and cover 12.

Figure 4A:
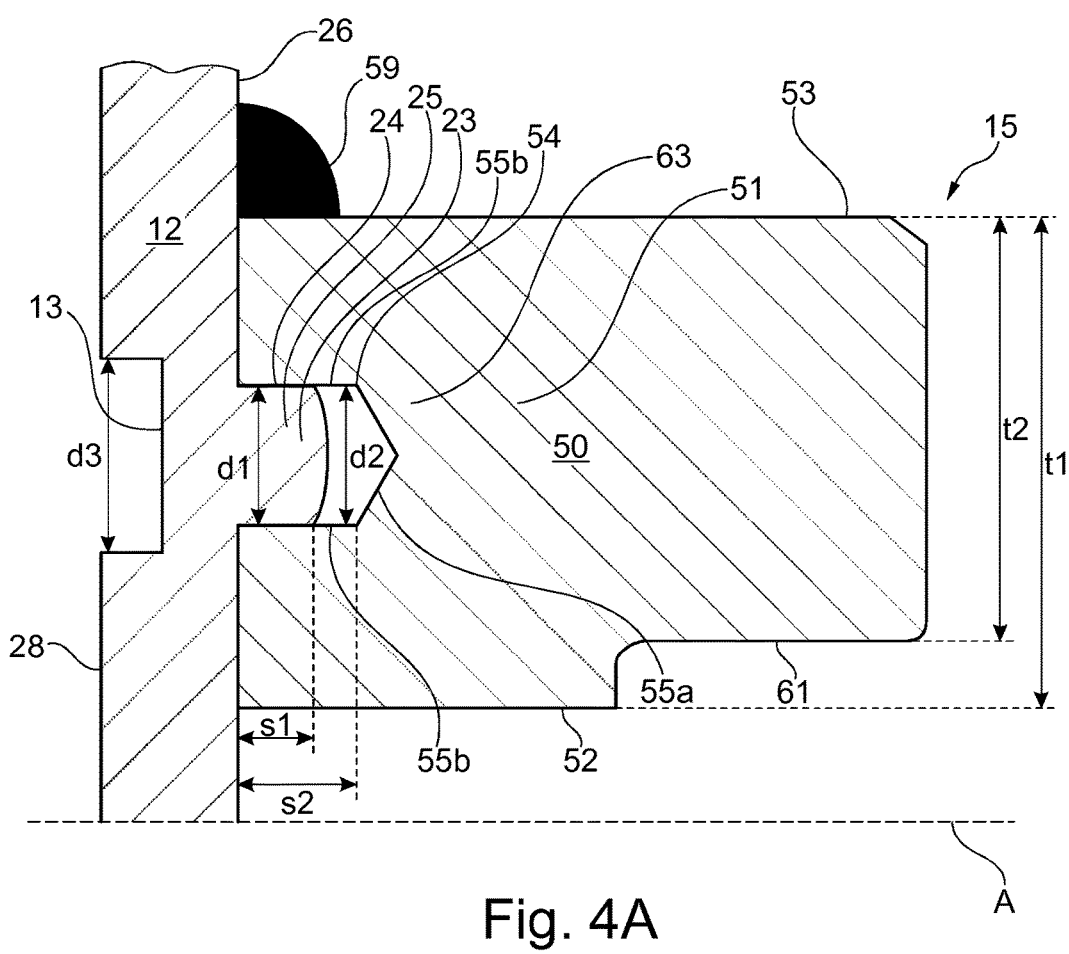
FIG. 4A illustrates a partial cross sectional side view of a torque converter including a cover hub assembly according to an example aspect.

FIG. 4A illustrates a partial cross sectional side view of a torque converter including a cover hub assembly according to an example aspect. In an example aspect, cover hub assembly 15 comprises: (i) axis of rotation A; (ii) cover 12 including: outer surface 28; inner surface 26; and, at least two extruded pins 25 protruding from inner surface 26 and symmetrical about axis of rotation A; and, (iii) cover hub 50 including: cylindrical wall 51 having: thickness t1; inner cylindrical surface 52, aligned with or concentric about axis of rotation A; and, outer cylindrical surface symmetrical 53 about axis of rotation A; cover mounting portion 63 including at least two mating holes 54 for receiving extruded pins 25; and, at least one flow groove 56 extending from outer cylindrical surface 53 to inner cylindrical surface 52. Flow groove 56 is not shown in FIG. 4A as is circumferentially offset from mating holes 54 as shown in FIG. 3. In an example aspect the cover hub assembly is useful in a torque converter comprising: cover hub assembly 15; seal 70; piston 14 including a recess for seal 70 and arranged for sealing engagement with cover hub assembly 15; and, at least one weld 59, referring to FIG. 3, located offset from the at least one flow groove, connecting hub 50 to cover 12.

Referring again to FIG. 4A, in an example aspect, cover hub assembly 15 includes hub 50 attached to cover 12 including inner surface 26, outer surface 28, and recess portion 13 having diameter d3. Cover 12 further includes extruded pin 25 having diameter d1 and including including head 23 and sidewalls 24, having a depth s1. In a example aspect, cover hub assembly 15 is centered by positioning extruded pins 25 of cover 12 and inserting into and matingly engaging with mating holes 54 of hub 50. In an example aspect, cover 12 further includes at least one recess portion 13 extending from outer surface 28 axially toward inner surface 26 and symmetrical about axis of rotation A. In an example aspect, extruded pin 25 is generally cylindrical, cuboid, or frustum shaped.

In an example aspect, mating hole 54, having a diameter d2, includes bottom portion 55a and side portions 55b, having depth s2. In an example aspect, diameter d1 is at most equal to diameter d2 and depth s1 is at most equal to depth s2. In an example aspect, hub 50 is matingly engaged with extruded pin 25 by a compressive force. In an example aspect, weld portion 59 connects cover 12 and hub 50. In an example aspect, weld portion 59 is circumferentially aligned with respect to mating holes 54 (refer to FIG. 4A) and circumferentially offset with respect to flow grooves 56. In an example aspect, flow grooves 56 are circumferentially offset from mating holes 54 (refer to FIG. 3).

In an example aspect, inner diameter of hub 50 includes a base portion 61, which may include chamfered edges, with thickness t2, where thickness t1 is greater than thickness t2, to accommodate bushing 62 (shown in FIG. 1). Extruded pins 25, having diameter d1, generally slip fit or are otherwise engaged with mating holes 54. In an example aspect, diameter d2 of mating hole 54 is at least equal to diameter d1 of pin 25. In another example aspect, diameter d2 is greater than diameter d1. In an example embodiment, depth s2 of mating hole 54 is at least equal to length s1 of pin 25. In another example aspect, depth s2 is greater than length s1. After positioning of the cover to the cover hub, attachment is secured or fixed by weld 59. In an example aspect, welds 59 are arranged in circumferential alignment with mating holes 54 while being offset from flow grooves 56.

Figure 4B:
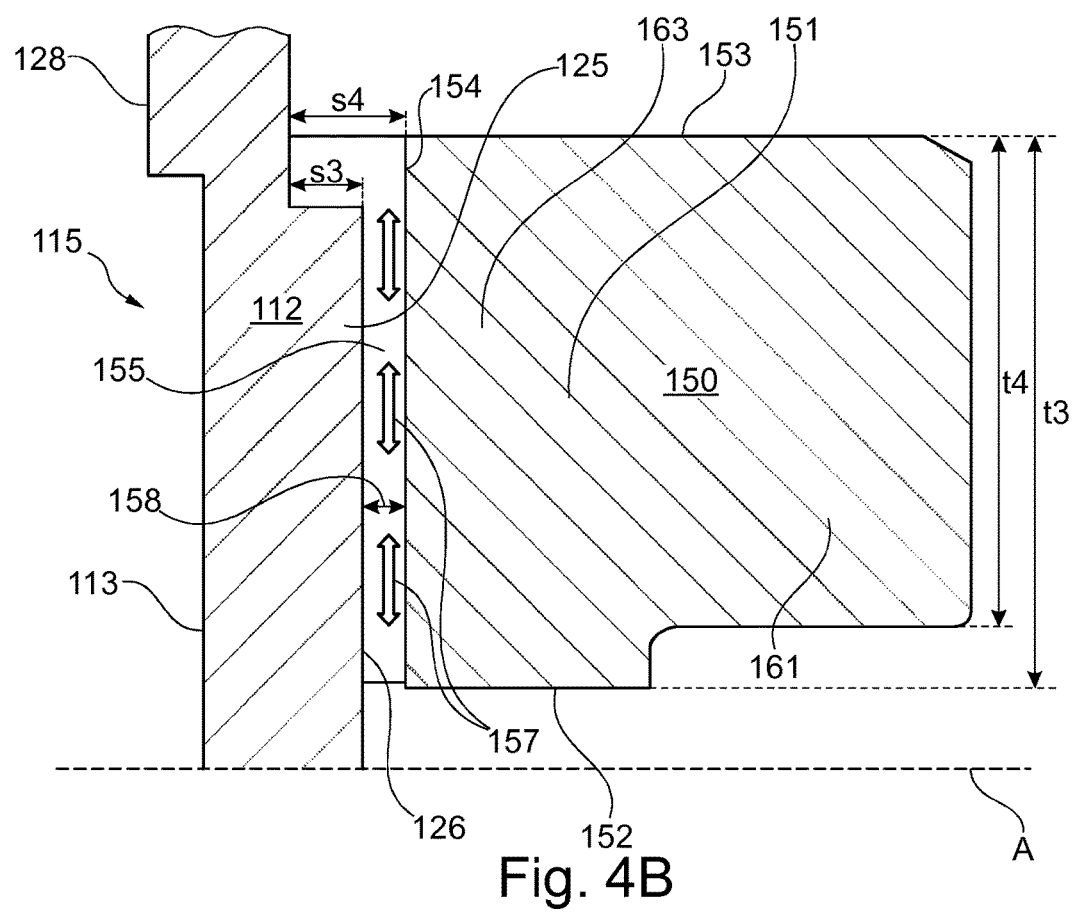
FIG. 4B illustrates a partial cross sectional side view of a torque converter including a cover hub assembly according to another example aspect.
Figure 5:
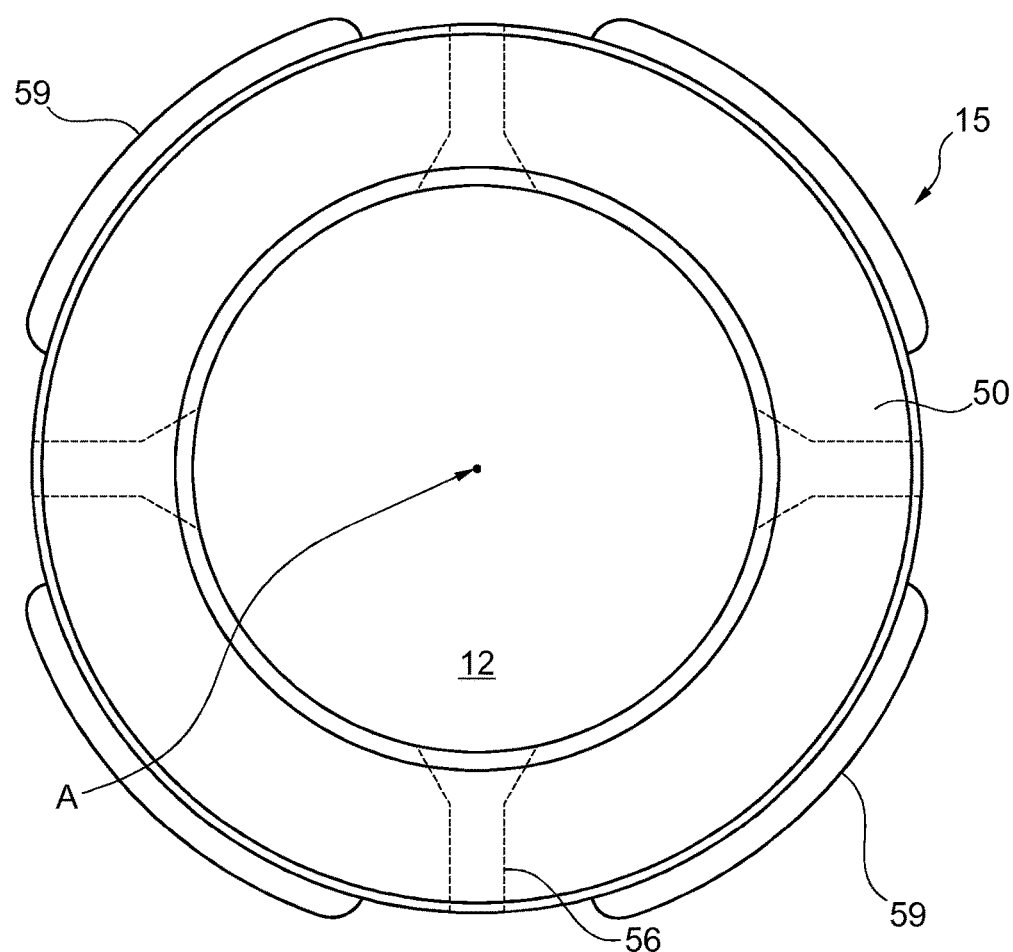
FIG. 5 illustrates a back view of a hub including weld pattern according to an example aspect.

FIG. 5 illustrates a back view of a hub including weld pattern according to an example aspect. Weld 59 attaches cover 12 to hub 50. The weld pattern of FIG. 5 is applicable to a cover hub assembly as is shown in FIG. 4A. Although in the embodiments shown in FIGS. 3-5, extruded pins 25 and mating holes 54 are generally cylindrical in shape, one of ordinary skill in the art will recognize that other shapes are also possible, e.g., square parallelepiped, cuboid, frustum, cone and paraboloid, and such shapes are within the spirit and scope of the claimed invention.

FIG. 4B illustrates a partial cross sectional side view of a torque converter including a cover hub assembly according to an alternative embodiment. In an example aspect, deeper cover hub flow grooves, or centering recesses, are installed on radially extending cover protrusions. In an example aspect, cover hub assembly 115 for a torque converter comprises: (i) axis of rotation A; (ii) cover 112 including: outer surface 128; and, inner surface 126 provided with one or more centering protrusions 125, each protrusion having depth s3; and, (iii) cover hub 150 including: cylindrical wall 151 having thickness t3 and including outer cylindrical surface 153 and inner cylindrical surface 152; and, cover mounting portion 163 provided with one or more centering recesses 154 for receiving said centering protrusion 125, each recess having depth s4, where depth s4 is greater than depth s3 to provide gap 158 in an axial direction arranged to form one or more recess channels 155 for radial fluid flow 157. In an example aspect the cover hub assembly is useful in a torque converter comprising: cover hub assembly 115 further comprising a seal; a piston including a recess for the seal and arranged for sealing engagement with the cover hub assembly; and at least one weld, located offset from the one or more recess channels, connecting the hub to the cover. Cover 112 includes recess portion 113. Cover hub 150 includes cover hub cylindrical wall 151 having thickness t3, cover mounting portion 163 and base portion 161, having thickness t4.

Figure 6:
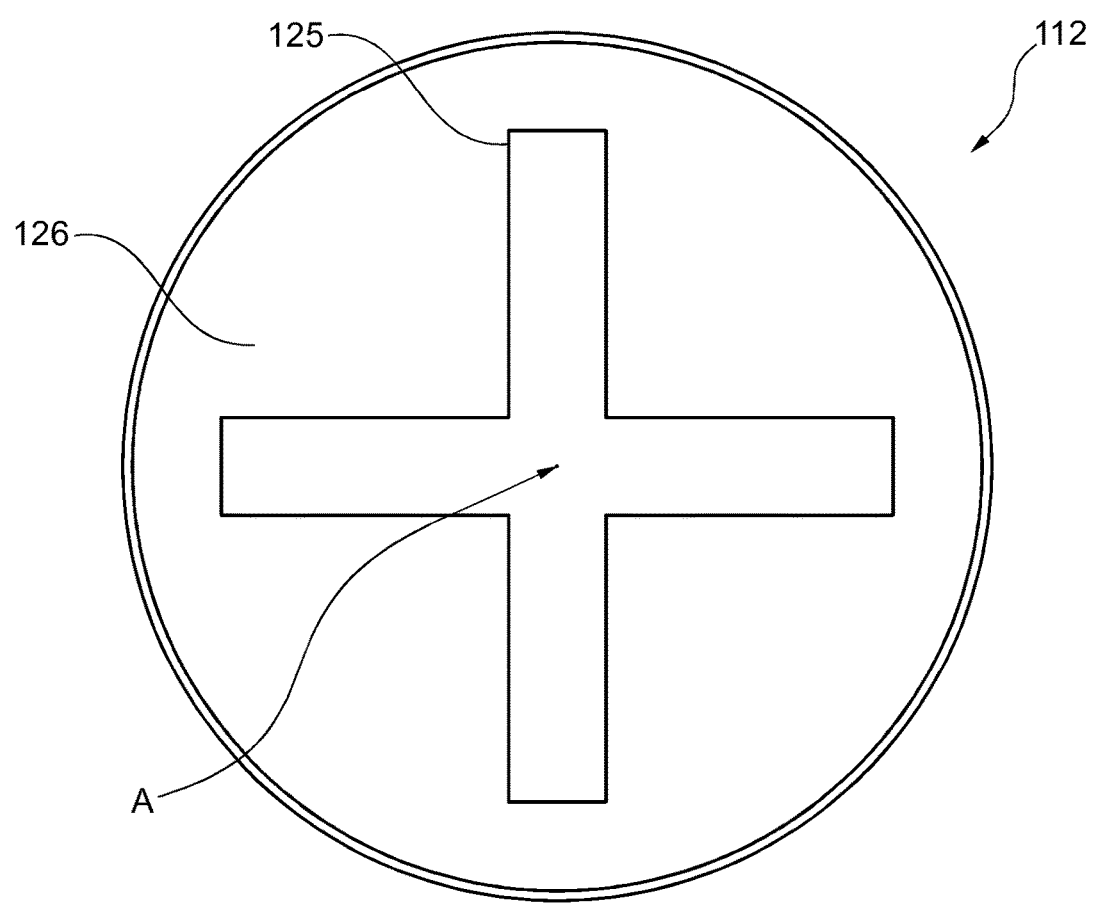
FIG. 6 illustrates a partial back view of cover inner surface according to an example aspect.
Figure 7:
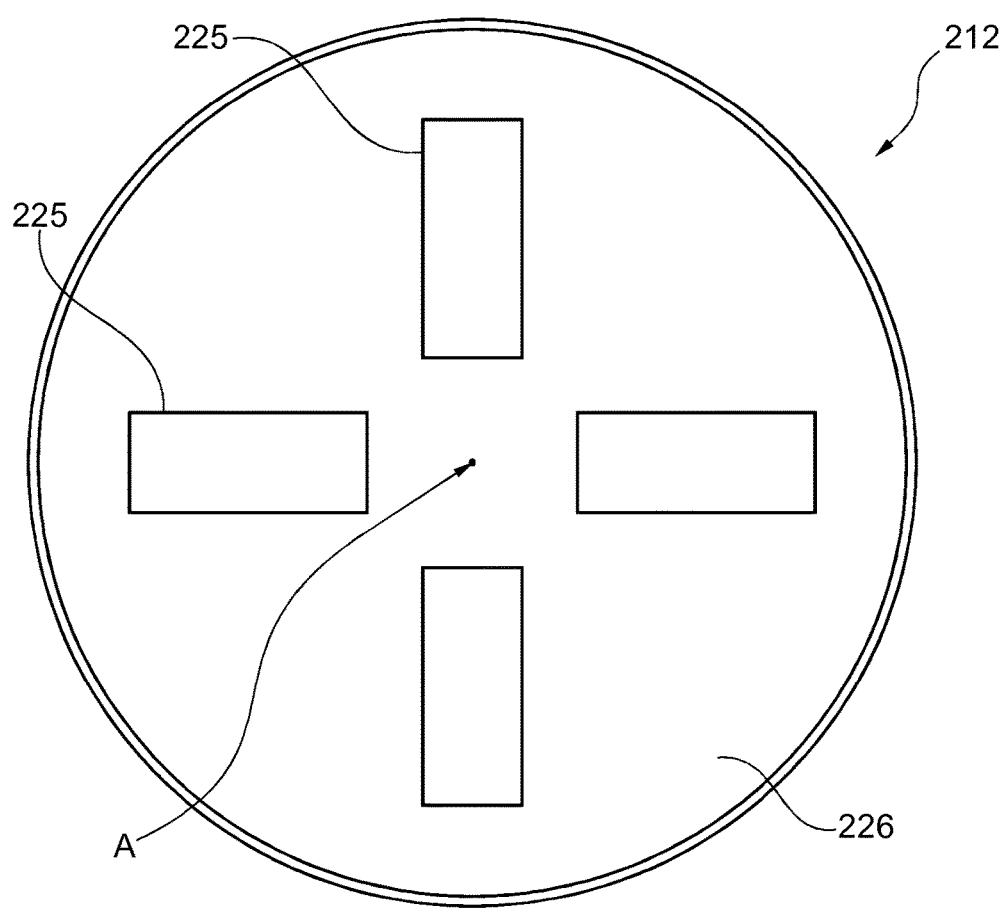
FIG. 7 illustrates a partial back view of cover inner surface according to another example aspect.

Referring again to FIG. 4B, in an example aspect recess channels 155 extend from outer cylindrical surface 153 to inner cylindrical surface 152. In an example aspect, recess channels 155 are aligned with centering protrusions 125. In an example aspect, cover hub assembly 115 further comprises at least one weld (not shown in FIG. 4B because offset) connecting cover 112 to cover hub 150, where recess channels 155 and centering protrusions 125 are offset with respect to the weld. In an example aspect, centering protrusion 125 protruding from inner surface 126 of cover 112 is generally a cross shaped protrusion 125 (see also FIG. 6) symmetrical about axis of rotation A. Alternatively, as shown in FIG. 7, cover 212 includes centering protrusions 225 protruding from inner surface 226. Any complementary configuration of protrusions and centering recesses may be employed and are not limited to the example herein. In an example aspect, the cover hub to complement cover 112 of FIG. 6 includes four centering recesses symmetrical about the axis of rotation and arranged for aligned engagement with cross shaped protrusion 125. Similarly, in an example aspect, the cover hub to complement cover 212 of FIG. 7 also includes four centering recesses symmetrical about the axis of rotation and arranged for aligned engagement with protrusion 225. In a cross shaped protrusion such as shown in the cover of FIG. 7, the extensions or 'arms' need to correspond in number and be symmetrical about axis A in complementary fashion with the centering recesses of the cover hub. It is possible, however, to have more hub recesses than cover arms for increased fluid flow.

In an example aspect, the extruded portion of cover 112 is mated with extended flow grooves or centering recesses 154 of cover hub 150. In other words, cover 112 is centered, positioned, or otherwise aligned with hub 150 via extruded portions being fitted into centering recesses or deepened flow grooves. In an example aspect, cover 112 further includes at least one recess portion 113 extending from outer surface 128 axially toward inner surface 126 and symmetrical about axis of rotation A.

In other example aspects, torque converter 10 comprises: (i) axis of rotation A; (ii) cover 12, 112 including: outer surface 28, 128; and, inner surface 26, 126 provided with one or more centering protrusions 25, 125, each protrusion having a first depth d1, d3; (iii) cover hub 50, 150 including: cylindrical wall 51, 151 having a thickness t1, t3 and including outer cylindrical surface 53, 153 and inner cylindrical surface 52, 152; and, cover mounting portion 63, 163 provided with one or more centering recesses 54, 154 for receiving said centering protrusions 25, 125 each recess 54, 154 having a second depth, s2, s4 where the second depth is greater than the first depth s1, s3; (iv) first seal 70; (v) piston 14 including a recess for the seal and arranged for sealing engagement with outer circumferential surface 53, 153 of cover hub 50, 150; second seal 80; (vi) turbine hub 60 arranged for sealing engagement with inner circumferential surface 52, 152 of cover hub 50,150; and, (vii) at least one weld 59, located offset from the one or more centering recesses 54,154, connecting hub 50, 150 to cover 12, 112. In another example aspect, the torque converter further comprises recess channel 155 for radial fluid flow 157, wherein recess channel 155 is formed axially by gap 158 between protrusion 125 and centering recess 154.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

LISTING OF ELEMENTS

A axis
10 torque converter
11 stud/lug
12 front cover
13 recess portion, diameter =d3
14 piston
15 cover hub assembly
16 rear cover
18 impeller
20 turbine
22 turbine shell
23 extruded pin head
24 sidewalls, length =s1
25 extruded pin/protruded portion, diameter =d1
26 inner surface of cover
28 outer surface of cover
30 one-way clutch
32 stator
34 clutch backing plate
36 side plate
38 clutch plate
40 damper assembly
42 drive plate
44 springs
45 seal
46 radially outward springs
47 rivet
48 flange
49 rivet
50 cover hub
51 cover hub cylindrical wall, thickness=t
52 cover hub inner cylindrical surface
53 cover hub outer cylindrical surface
54 mating hole, diameter=d2
55a mating hole bottom portion
55b mating hole side portion, depth=s2
56 flow groove
56a flow groove inner portion, width=w1
56b flow groove outer portion, width=w2
57 opening
58 leaf springs
59 weld
60 turbine hub
61 base portion of cover hub cylindrical wall, thickness=t2
62 bushing
63 cover mounting portion of cover hub
70 seal
80 seal
84 bearing
86 bearing
88 inner race
90 cover pilot
92 roller
94 outer race
96 weld
112 cover
113 recess portion
115 cover hub assembly
125 centering protrusion, depth=s3
126 inner surface of cover
128 outer surface of cover
150 cover hub
151 cover hub cylindrical wall, thickness=t3
152 cover hub inner cylindrical surface
153 cover hub outer cylindrical surface
154 centering recess, depth=s4
155 recess channel
157 radial fluid flow
158 gap
161 base portion of cover hub cylindrical wall, thickness=t4
163 cover mounting portion of cover hub
212 cover
225 centering protrusion
226 inner surface of cover

What we claim is:

1. A cover hub assembly for a torque converter comprising:
   an axis of rotation;
   a cover including:
      an outer surface;
      an inner surface; and,
      at least two extruded pins protruding from inner surface and symmetrical about the axis of rotation; and,
   a cover hub including:
      a cylindrical wall having:
         a thickness;
         an inner cylindrical surface, symmetrical about the axis of rotation, forming an opening; and, an outer cylindrical surface symmetrical about the axis of rotation;
a cover mounting portion including at least two mating holes for receiving said extruded pins; and,
at least one flow groove extending from the outer cylindrical surface to the inner cylindrical surface.

2. The cover hub assembly as in claim 1 wherein the at least one extruded pin includes a head having a first diameter and sidewalls having a first depth.

3. The cover hub assembly as in claim 2 wherein the mating hole includes a bottom portion having a second diameter and side portions having a second depth.

4. The cover hub assembly as in claim 3 wherein the first diameter is at most equal to the second diameter and the first depth is at most equal to the second depth.

5. The cover hub assembly as in claim 1 wherein the flow grooves are circumferentially offset from the mating holes.

6. The cover hub assembly as in claim 1 wherein the hub is matingly engaged with the extruded pin by a compressive force.

7. The cover hub assembly as in claim 1 further comprising at least one weld portion connecting the cover and the hub.

8. The cover hub assembly as in claim 7 wherein the at least one weld portion is circumferentially aligned with respect to the mating holes and circumferentially offset with respect to the flow grooves.

9. The cover hub assembly as in claim 1 wherein the cover further includes at least one recess portion extending from outer surface axially toward inner surface and symmetrical about the axis of rotation.

10. The cover hub assembly as in claim 1 wherein the extruded pin is generally cylindrical or frustum shaped.

11. A torque converter comprising:
the cover hub assembly of claim 1 further comprising a seal;
a piston including a recess for the seal and arranged for sealing engagement with the cover hub assembly; and,
at least one weld, located offset from the at least one flow groove, connecting the hub to the cover.

12. A cover hub assembly for a torque converter comprising:
an axis of rotation;
a cover including:
an outer surface; and,
an inner surface provided with one or more centering protrusions, each protrusion having a first depth;
a cover hub including:
a cylindrical wall having a thickness and including an outer cylindrical surface and an inner cylindrical surface; and,
a cover mounting portion provided with one or more centering recesses for receiving said centering protrusion, each recess having a second depth, where the second depth is greater than the first depth to provide a gap in an axial direction arranged to form one or more recess channels for radial fluid flow.

13. The cover hub assembly as in claim 12 wherein the one or more recess channels extend from the outer cylindrical surface to the inner cylindrical surface.

14. The cover hub assembly as in claim 13 wherein the recess channels are aligned with the centering protrusions.

15. The cover hub assembly as in claim 12 further comprising at least one weld connecting the cover to the cover hub, where the recess channels and centering protrusions are offset with respect to the weld.

16. The cover hub assembly as in claim 12 wherein the centering protrusion of the cover is generally a cross shaped protrusion symmetrical about the axis of rotation.

17. The cover hub assembly as in claim 16 wherein the cover hub includes four centering recesses symmetrical about the axis of rotation and arranged for aligned engagement with the cross shaped protrusion.

18. A torque converter comprising:
the cover hub assembly of claim 12 further comprising a seal;
a piston including a recess for the seal and arranged for sealing engagement with the cover hub assembly; and
at least one weld, located offset from the one or more recess channels, connecting the hub to the cover.

19. A torque converter comprising:
an axis of rotation;
a cover including:
an outer surface; and,
an inner surface provided with one or more centering protrusions, each protrusion having a first depth;
a cover hub including:
a cylindrical wall having a thickness and including an outer cylindrical surface and an inner cylindrical surface; and,
a cover mounting portion provided with one or more centering recesses for receiving said centering protrusions, each recess having a second depth, where the second depth is greater than the first depth;
a first seal;
a piston including a recess for the seal and arranged for sealing engagement with the outer cylindrical surface of the cover hub;
a second seal;
a turbine hub arranged for sealing engagement with the inner cylindrical surface of the cover hub; and,
at least one weld, located offset from the one or more centering recesses, connecting the hub to the cover.

20. The torque converter of claim 19 further comprising a recess channel for radial fluid flow, wherein the recess channel is formed axially by a gap between the protrusion and the centering recess.

* * * * *